US012722447B2

(12) United States Patent
Grodde et al.

(10) Patent No.: US 12,722,447 B2
(45) Date of Patent: Sep. 1, 2026

(54) MECHATRONIC CHASSIS DEVICE FOR A MOTOR VEHICLE

(71) Applicant: ZF Friedrichshafen AG, Friedrichshafen (DE)

(72) Inventors: Benjamin Grodde, Ravensburg (DE); Daniel Gagg, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 101 days.

(21) Appl. No.: 18/701,018

(22) PCT Filed: Sep. 12, 2022

(86) PCT No.: PCT/EP2022/075202
§ 371 (c)(1),
(2) Date: Apr. 12, 2024

(87) PCT Pub. No.: WO2023/061676
PCT Pub. Date: Apr. 20, 2023

(65) Prior Publication Data

US 2024/0399813 A1 Dec. 5, 2024

(30) Foreign Application Priority Data

Oct. 15, 2021 (DE) ..................... 10 2021 211 662.0

(51) Int. Cl.
*B60G 21/10* (2006.01)
*B60G 17/019* (2006.01)

(52) U.S. Cl.
CPC ......... *B60G 21/106* (2013.01); *B60G 17/019* (2013.01); *B60G 2202/135* (2013.01); *B60G 2202/422* (2013.01); *B60G 2401/26* (2013.01); *B60G 2800/012* (2013.01)

(58) Field of Classification Search
None
See application file for complete search history.

(56) References Cited

U.S. PATENT DOCUMENTS 10,625,774 B2 4/2020 Sworowski et al.
10,960,920 B2 3/2021 Beer
11,137,314 B2 10/2021 Collier et al.
2005/0211518 A1* 9/2005 Kraus ................ B60G 21/0555 188/321.11

(Continued)

FOREIGN PATENT DOCUMENTS

DE 10 2016 222 251 A1 5/2018
DE 10 2017 200 556 A1 7/2018

(Continued)

OTHER PUBLICATIONS

European Patent Office, International Search Report issued in International patent application PCT/EP2022/075202 (Dec. 12, 2022).

(Continued)

*Primary Examiner* — Farhana A Hoque
(74) *Attorney, Agent, or Firm* — Secant IP, PLLC

(57) ABSTRACT

Disclosed is a mechatronic chassis device (6) for a motor vehicle comprises a housing (7) and at least one functional element (11) in the housing (7). The device is characterized by means (14) for recognizing the ingress of a liquid medium into the housing (7).

16 Claims, 6 Drawing Sheets

(56) References Cited

U.S. PATENT DOCUMENTS

| | | | | |
|---|---|---|---|---|
| 2016/0109500 A1* | 4/2016 | Chang | .................... | G01R 31/52 324/509 |
| 2022/0045409 A1* | 2/2022 | Werner | ................. | H01M 50/24 |

FOREIGN PATENT DOCUMENTS

| | | | | |
|---|---|---|---|---|
| DE | 102018219370 B3 * | 10/2019 | ............ | G01M 3/183 |
| DE | 10 2019 103 875 A1 | 8/2020 | | |
| JP | 2006111032 A | 4/2006 | | |

OTHER PUBLICATIONS

European Patent Office, Written Opinion issued in International patent application PCT/EP2022/075202 (Dec. 12, 2022).

German Patent Office, Office Action issued in German patent application No. 10 2021 211 662.0 (Jun. 23, 2022).

* cited by examiner

MECHATRONIC CHASSIS DEVICE FOR A MOTOR VEHICLE

RELATED APPLICATIONS

This application claims the benefit under 35 U.S.C. § 371 as a U.S. National Phase Application of application no. PCT/EP2022/075202, filed on 12 Sep. 2022, which claims the benefit of German Patent Application no. 10 2021 211 662.0 filed on 15 Oct. 2021, the contents of which are hereby incorporated herein by reference in their entireties.

FIELD OF THE DISCLOSURE

The invention relates to a mechatronic chassis device for a motor vehicle and to an adjustable roll stabilizer for a motor vehicle.

BACKGROUND

Mechatronic chassis devices of various types for use in a motor vehicle are known from the prior art. In the context of the present invention this is understood to be a device used in the chassis of a motor vehicle, which when considered in its own right or in co-operation with other devices associated with the motor vehicle, forms a mechatronic system. Correspondingly, the mechatronic chassis device can be a component of a mechatronic system and/or such a system in itself. According to a preferred field of application of the invention, the mechatronic chassis device is an actuator for an adjustable roll stabilizer of a motor vehicle.

In an entirely general sense, it is known to equip motor vehicles with a so-termed roll stabilizer in order increase the stability of the motor vehicle and to improve its driving comfort. In the simplest version this consists of an essentially C-shaped torsion bar which is mounted in its middle section rotatably relative to the vehicle body and whose outer, opposite ends are coupled to respective wheel suspensions. By virtue of that design, the roll stabilizer ensures that when the vehicle drives round a curve, the vehicle body not only leans toward the outside of the curve (owing to the centrifugal force), but also that the wheel on the inside of the curve is somewhat lower.

To increase the driving comfort and vehicle stability further it is also known to make such roll stabilizers adjustable. For that purpose, the roll stabilizer comprises an actuator and is divided into two stabilizer sections that can be rotated relative to one another with the help of the actuator. By rotating the stabilizer sections relative to one another about a rotation axis, a rolling movement of the vehicle body can be controlled, or a rolling movement of the vehicle body caused by external influences is counteracted in a controlled manner. In known adjustable roll stabilizers, expediently an electric motor is used as the drive of the actuator, wherein the electric motor is usually drivingly connected to a mechanical transmission, particularly in the structural form of a single- or multi-stage planetary gearset in order to transform the motor rotation speed or the torque of the motor as required. In this connection reference should be made to DE 10 2017 200 556 A1, which describes an adjustable roll stabilizer.

In the technical field of adjustable roll stabilizers for motor vehicles, the so-termed actuator is a mechatronic chassis device. This usually comprises a housing and, in the housing, at least one functional element. A functional element can be understood to be various components, assemblies, or the like, which perform a function within the mechatronic chassis device. In particular, mechanical, electro-technical and/or information-technical tasks, including measurement-technological tasks, can be carried out by the functional element.

In a very general sense, during the operational use of an adjustable roll stabilizer it is necessary to protect the at least one functional element of the mechatronic chassis device present in the housing against outside influences while the motor vehicle is operating. As a consequence of the location of mechatronic chassis devices underneath the vehicle body, i.e., close to the ground being driven over, when the motor vehicle is operating these are exposed among other things to the influence, particularly of the external effects of water. For a functional element present in the housing of the mechatronic chassis device, any water that makes its way into the housing can have various disadvantageous consequences. For example, in relation to a mechanical functional element, functional defects such as those caused by dirt or corrosion can occur. With electric or electronic functional elements, malfunctions, failure, or even destruction can also take place due to short-circuits, all of which then compromise the function of the mechatronic chassis device as a whole.

In the case of a mechanical chassis device in the form of a actuator for an adjustable roll stabilizer, in the housing there is also usually a mechatronic component in the form of an electronic printed circuit board on which are mounted the control electronics connected on the one hand to the power and signal systems of the motor vehicle, and on the other hand to the electric motor and the sensors associated with the actuator. Not exclusively, but very particularly for electric and/or electronic functional elements, inside the housing of the mechatronic chassis device, protection must be provided against external effects caused by water or comparable media.

From DE 10 2016 222 251 A1 a mechatronic chassis device in the form of an adjustable roll stabilizer is known, whose housing can be tested for leakage by passing in compressed air through a test cable used for the purpose. A leakage test is a quality control measure carried out at a definite time (for example, after assembly or production). Alterations that take place later, for example due to aging or wear of the mechatronic chassis components, can have the result that the leakproof character established to begin with can no longer be guaranteed at a later time. Besides, the method requires the availability of a test cable suitable for the introduction of the compressed air.

SUMMARY

A purpose of the present invention is to indicate a mechatronic chassis device for a motor vehicle, which can contribute in an alternative manner and with little design effort toward protecting the mechatronic chassis device against the external influence of liquid media, in particular water, even during operational use. Moreover, an adjustable roll stabilizer is indicated, which fulfills the above objective.

The objective is achieved by a mechatronic chassis device as disclosed herein. This is a mechatronic chassis device for a motor vehicle, which comprises a housing, and in the housing at least one functional element, characterized by means for recognizing the ingress of a liquid medium into the housing.

According to the invention, thereby a solution alternative to that of DE 10 2016 222 251 A1 is found which, in the housing of a mechatronic chassis device, is able to protect a functional element present therein against the disadvantageous effects of the ingress of external media. In this context it was recognized that liquid media in particular, which get into the housing for example because of leaks, can affect the functionality adversely. At the same time, it was recognized that the ingress of a liquid medium into the housing can be detected by technically relatively simple means. The recognition of a medium ingress in turn constitutes a decisive measure for mitigating or in the ideal case entirely avoiding the negative results of such ingress. Various means are conceivable by means of which the ingress of a liquid medium into the housing can be recognized.

According to a preferred further development of the mechatronic chassis device, the means for recognizing the ingress of a liquid medium into the housing comprise a sensor arrangement which can be operated to monitor the filling level of the housing with an electrically conducting medium. This measure is based on the recognition that the housing of a mechatronic chassis device not only serves to accommodate at least one functional element for transmitting force and torque and to provide protection against external mechanical influences, but also that the housing forms a container in which a liquid medium such as water that has made its way into the housing collects. Due to gravity such a liquid medium automatically collects at the lowest point. In other words, with increasing medium ingress the housing progressively fills up with the medium, such as water. This realization is used by the invention, as also is the recognition that the medium, water, which usually enters is electrically conductive. In a simply designed manner the electrical conductivity enables the filling level of the housing with the electrically conductive medium to be monitored.

Monitoring the filling level of the housing with an electrically conductive liquid medium, such as water in particular, can be done advantageously in that a measurement distance extending in the housing, preferably a plurality of such measurement distances, are monitored for their electrical conductivity. Such a measurement distance is thus expediently designed so that its electrical conductivity changes when a medium enters, when a particular filling level of the housing is reached. In the housing a single measurement distance of that type can be provided in order to bring this about. By arranging a plurality of such measurement distances, medium entries of different type, different extents or under different conditions (for example different directions) can be recognized.

In an expedient further development of the mechatronic chassis device, its housing is made from an electrically conductive material. A measurement distance as described above preferably extends from a measurement point in each case located on the functional element to the electrically conductive housing. Such an arrangement has the advantage that measurement distances can be formed in a simply designed manner since, as an electrically conductive body, the housing itself can already be used as an end point of the measurement distance. With appropriate electrical circuitry, expediently a connection of the housing to the ground potential of the monitoring circuit, the measurement distance can therefore be monitored for its electrical conductivity by monitoring the electrical voltage between the respective measurement point and the housing (equal to the measurement potential). In that way, by simple means a possibility is provided for recognizing the ingress of a liquid medium into the housing.

As already mentioned earlier, the functional element present in the housing can basically be any type of component or assembly. A particularly advantageous design can be achieved if the at least one functional element present in the housing is a mechatronic component, in particular a printed circuit board for holding electronic components, preferably for the control and/or energy supply of a further functional element present in the housing and/or for signal processing. Since in particular electric and/or electronic components are arranged on a printed circuit board, which are as a rule sensitive to the effects of moisture, and since on a printed circuit board measurement points can be arranged comparatively simply, effective protection of a particularly vulnerable functional element can be realized in a simple manner.

It should be mentioned that alternatively or in addition the functional element can be an electric motor, a sensor and/or other components or assemblies.

The invention gains particular and additional importance if the functional element, especially in the form of a printer circuit board, is divided into at least two parts, particularly parts separated electrically from one another. Such a division can be necessitated, for example, if when the motor vehicle containing the mechatronic chassis device has on-board networks that operate at two different voltage levels and each of the two parts separated electrically from one another is associated with a different on-board network. In such a case there is a greater need to prevent a short-circuit between the two parts, the more so since in that case not only can malfunctions or damage to the mechatronic chassis device take place, but even damage to the vehicle itself or its on-board networks or to other vehicle equipment connected thereto.

In a preferred further development of the chassis device, the functional element has an edge section which is close to the housing and in particular extends circumferentially, on which at least one measurement point and preferably a plurality of measurement points distant from one another is/are arranged. Thanks to an arrangement of the measurement points close to the edge, the measurement distance is relatively short (since the measurement point and the shortest distance to the housing are comparatively small). Correspondingly, a comparatively low filling level in the housing can already be recognized relative to a measurement distance lower in relation to a mid-point of the housing.

As already mentioned, the functional element can be a component or assembly of various types. Not exclusively, but particularly when this is a mechatronic component, especially a printed circuit board, it is advantageous for the functional element to be in the form of an essentially flat body with an installation position perpendicular to the rotation axis of the housing. In that case the functional element extends essentially in a plane running transversely to the rotation axis of the housing.

Depending on the type of the mechatronic chassis device, its housing can be designed in various ways. In the context of the invention, it is advantageous for the housing to be essentially cylindrical, extending along a rotation axis. Namely, if in the installed position of the mechatronic chassis device the rotation axis is approximately horizontal, this has the advantage that a liquid medium that makes its way into the housing automatically collects in the lowest area of the housing and can be detected there in a simple manner by means of the sensor arrangement.

Expediently, a measurement point of the sensor arrangement is in each case preferably connected to an electrical voltage source with interposition of a series resistance, whereby the housing is optionally connected to the ground potential of the electrical voltage source with the interposition of a series resistance.

Advantageously, the monitoring of a so-termed designed measurement distance for its electrical conductivity by monitoring the electrical voltage between a particular measurement point and the housing, takes place in particular by means of a control unit.

The mechatronic chassis device is advantageously characterized by a control unit that can be operated to associate a voltage drop at one of the measurement points to below a specifiable threshold value with the fact that a medium has entered the housing, and to trigger a compensating reaction. In the simplest case a compensating reaction can be an error message, whereas further or alternative measures such as switching off the mechatronic chassis device or other vehicle equipment, or a message to a higher-level system at the vehicle plane are also conceivable.

According to an advantageous further development of the mechatronic chassis device, a measurement point or preferably the plurality of measurement points are in each case arranged so that if a medium has entered and when a critical filling level of the housing is reached by the liquid medium, at least one measurement point is immersed in the medium and thereby an electrical connection between the immersed measurement point and the housing is produced.

Also advantageously, points of the plurality of measurement points are distributed around a circumferential area of the housing so that, regardless of the rotational orientation of the housing and/or the functional element relative to the rotation axis, there is at least one measurement point in a lower area of the housing and this can therefore be used for the earlier recognition of medium ingress into the housing. Such a distribution of a plurality of measurement points around the circumference of the housing thus has the advantage that medium ingress can be recognized even with different orientations of the housing (rotation about the rotation axis) and/or of the functional element (installed position) in a similar manner. This extends the field of application and facilitates assembly.

It has already been mentioned that the mechatronic chassis device can preferably be an actuator, in particular for an adjustable roll stabilizer. It should also be mentioned that besides producing similar effects, other types of actuators, for example for a steering device or for a braking device can be used, and/or that the mechatronic chassis device can be a sensor.

In the preferred case, the mechatronic chassis device is an actuator for an adjustable roll stabilizer. This mechatronic chassis device preferably also comprises an electric motor and a transmission, preferably a multi-stage planetary transmission, wherein in addition to the functional element the electric motor and the transmission are also accommodated in the housing of the mechatronic chassis device.

Besides a mechatronic chassis device, the invention also relates to an adjustable roll stabilizer for a motor vehicle. According to the invention this comprises two stabilizer sections which can be coupled to wheel suspensions of associated wheels of the motor vehicle, and a mechatronic chassis device as described earlier, with which the stabilizer sections can be rotated about a rotation axis relative to one another in order to influence the rolling behavior of the motor vehicle.

BRIEF DESCRIPTION OF THE DRAWINGS

Below, the invention is explained in greater detail with reference to the attached drawing. From this, further advantageous effects of the invention emerge. The drawings show.

DETAILED DESCRIPTION

Figure 1:
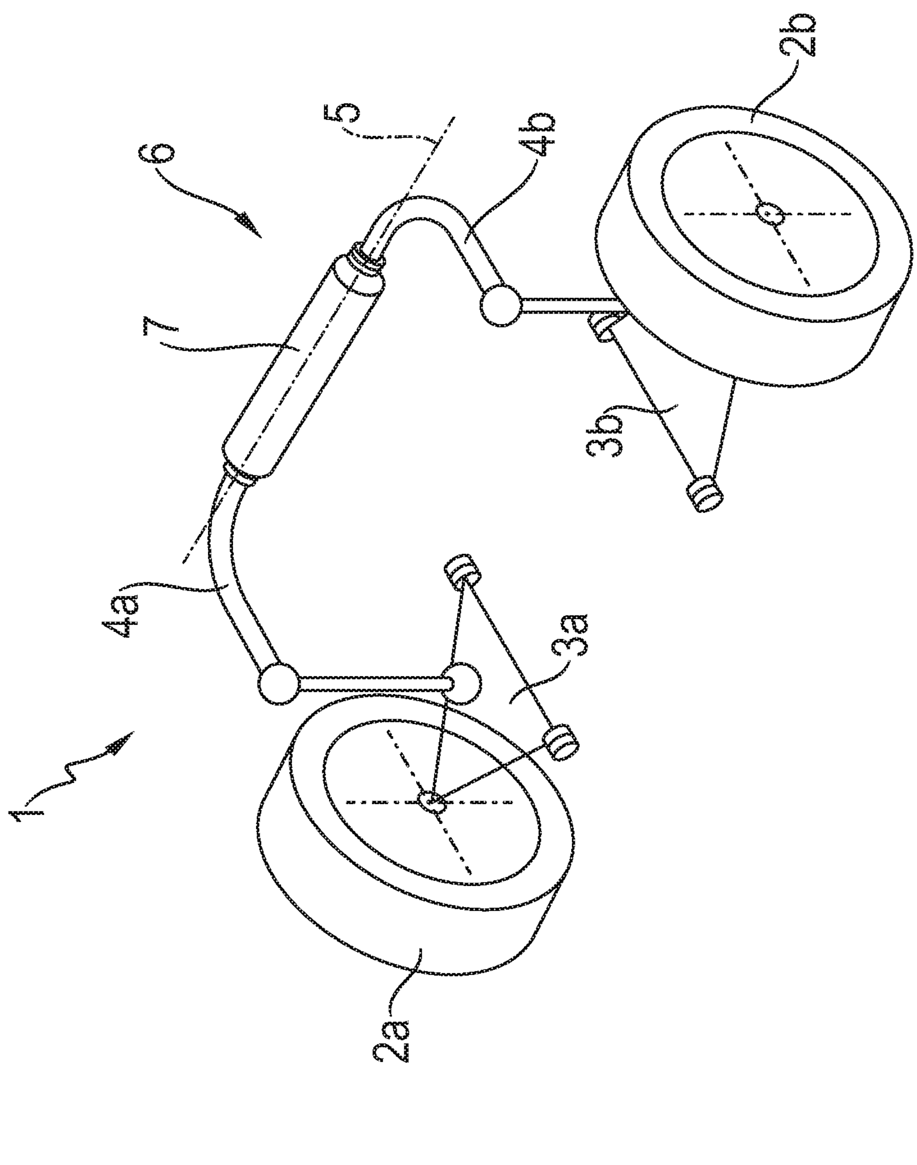
FIG. 1: A schematic view of an adjustable roll stabilizer.

First, to make clear the preferred field of application of the invention, FIG. 1 shows a simplified schematic view of an adjustable roll stabilizer 1. The adjustable roll stabilizer 1 is part of a chassis (not shown completely), of a motor vehicle (not shown). A wheel 2*a* on the left and a wheel 2*b* on the opposite side of the vehicle, on the right, are connected by respective wheel suspensions 3*a* on the left and 3*b* on the right to a body of the motor vehicle (not shown here for representational reasons). Each of the wheel suspensions 3*a*, 3*b* is coupled by respective coupling means in the form of a pendulum support (no more of which is shown here) to an end of an associated stabilizer section 4*a* on the left and a stabilizer section 4*b* on the right. The two stabilizer sections 4*a*, 4*b* are connected to one another in the middle of the vehicle by an actuator 6.

In a manner known as such, the adjustable roll stabilizer 1 is mounted to rotate about a rotation axis 5 relative to the vehicle body (mountings not shown). The actuator, here shown in simplified form as a cylindrical body, comprises a housing 7 in which, among other things, an electric motor and a multi-stage planetary transmission drivingly connected thereto are arranged. Via the motor-transmission unit the stabilizer sections 4*a*, 4*b* are in driving connection with one another. When the electric motor is at rest the two stabilizer sections 4*a*, 4*b* are connected solidly with one another by the actuator 6. By operating the electric motor, depending on the rotation direction of the electric motor the stabilizer sections 4*a*, 4*b* can be rotated relative to one another around the rotation axis 5. In that way, in a manner known as such the adjustable roll stabilizer 1 can be adjusted.

Figure 2:
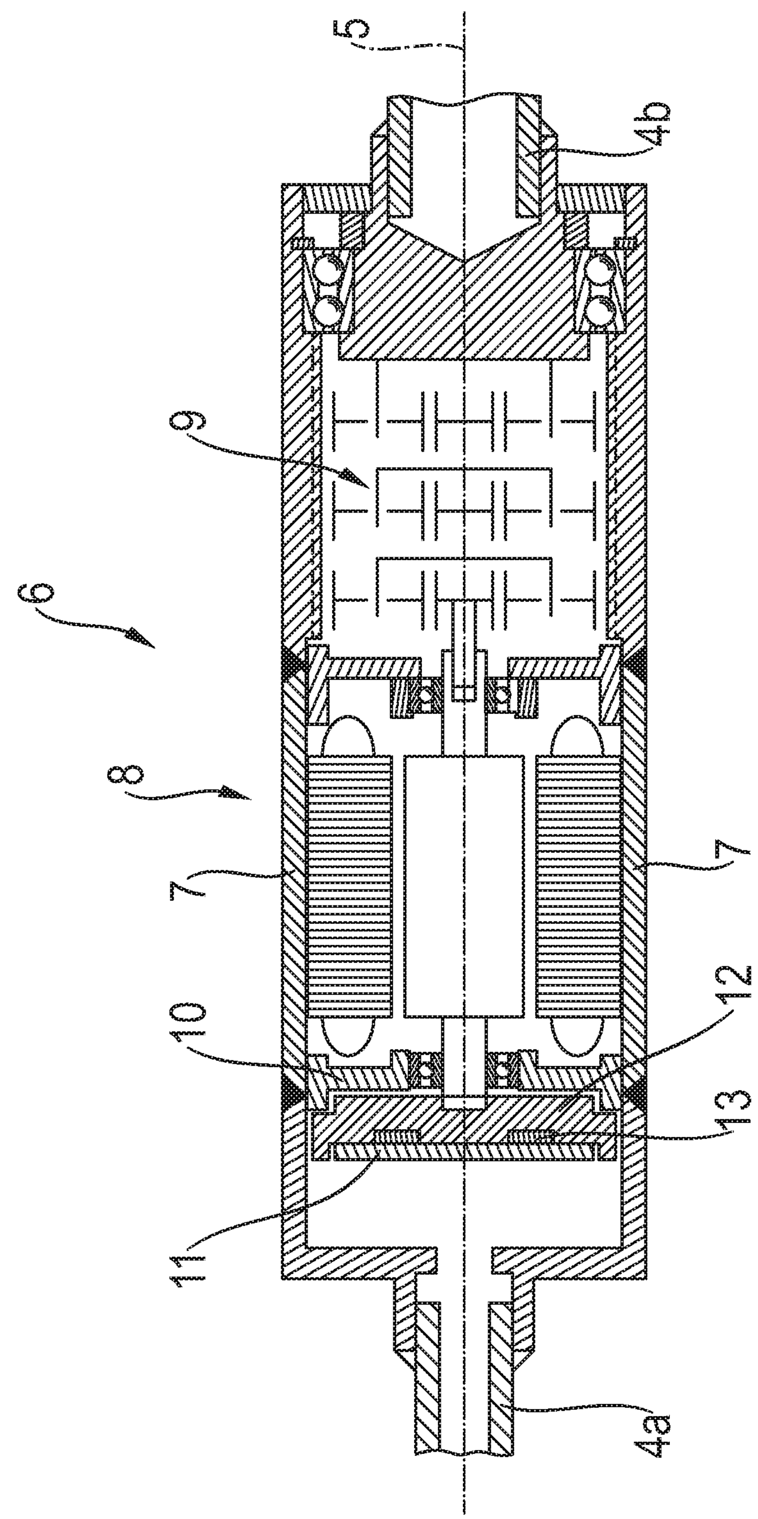
FIG. 2: A mechatronic chassis device in the form of an actuator for an adjustable roll stabilizer, represented schematically in section.

FIG. 2 shows a schematic, simplified sectioned view of an actuator 6, which can be used in an adjustable roll stabilizer 1 as explained with reference to FIG. 1. Accordingly, the housing 7 of the actuator 6 extends essentially as a cylindrical body along the rotation axis 5. The left-hand stabilizer section 4*a* is connected rotationally fixed to the housing 7 of the actuator 6. The right-hand stabilizer section 4*b* is connected to a drive element which is mounted by way of a roller bearing so that it can rotate relative to the housing 7 of the actuator 6, and which forms a drive output side of the motor-transmission unit in the housing 7. In a manner known as such the housing 7 contains an electric motor 8 which has a drive output shaft coaxial with the rotation axis 5. By these means the electric motor 8 drives an in this case three-stage planetary transmission 9, which on its output side is drivingly connected to the right-hand stabilizer section 4*b*. Correspondingly, by operating the electric motor 8 the multi-stage planetary transmission is driven, so that thereby the right-hand stabilizer section 4*a* can be rotated about the rotation axis 5 relative to the left-hand stabilizer section 4*b* (which is immobilized on the housing).

On a side of the electric motor 8 facing away from the planetary transmission 9 there is fixed to the housing 7 a bearing disk 10, among other things as a bearing for the motor shaft of the electric motor 8.

In the housing 7 of the actuator 6, besides the electric motor 8 and the multi-stage planetary transmission 9 there is a further important functional element in the form of a printed circuit board 11. The printed circuit board 11 is a board for holding electronic components, which in a general way serve for energy supply, for signal processing and for the control of the actuator 6. It should be pointed out expressly that its representation in FIG. 2 is purely schematic and in particular that it can also be positioned elsewhere inside the housing 7 and/or that it can have other dimensions or be otherwise designed.

In the example shown, a power module 13 is arranged on the printed circuit board 11 and the printed circuit board 11 is in contact with a heat sink 12, which during operation performs a passive cooling function in order to prevent overheating of electronic components. It is understood that the printed circuit board 11 is connected to at least one on-board electrical network of the associated motor vehicle in order to be supplied with a necessary system voltage, and that the printed circuit board 11 is electrically connected to the electric motor 8 and if necessary to other components such as sensors accommodated in the housing 7.

For the connection of the printed circuit board 11 to an on-board electrical network of the motor vehicle, and also for signal transmission to the motor vehicle, the housing 7 has to be connected thereto. Correspondingly, at least in one area (not indicated here) the housing 7 has an opening. Even when careful sealing of such an opening is attempted, over the lifetime of the actuator 6 it cannot be excluded that under the action of severe environmental influences such as spray-water, moisture in the form of water will make its way into the housing 7. Water can also find its way in, in the area of the rotary bearing of the right-hand stabilizer section **4*b* relative to the housing 7. Particularly having regard to the perfect functioning of electronic components inside the housing 7, especially the printed circuit board 11, it is desirable to recognize the ingress of a liquid medium into the housing 7 at an early stage. A possible solution for this is described with reference to FIGS. 3 to 5** shown below.

Figure 3:
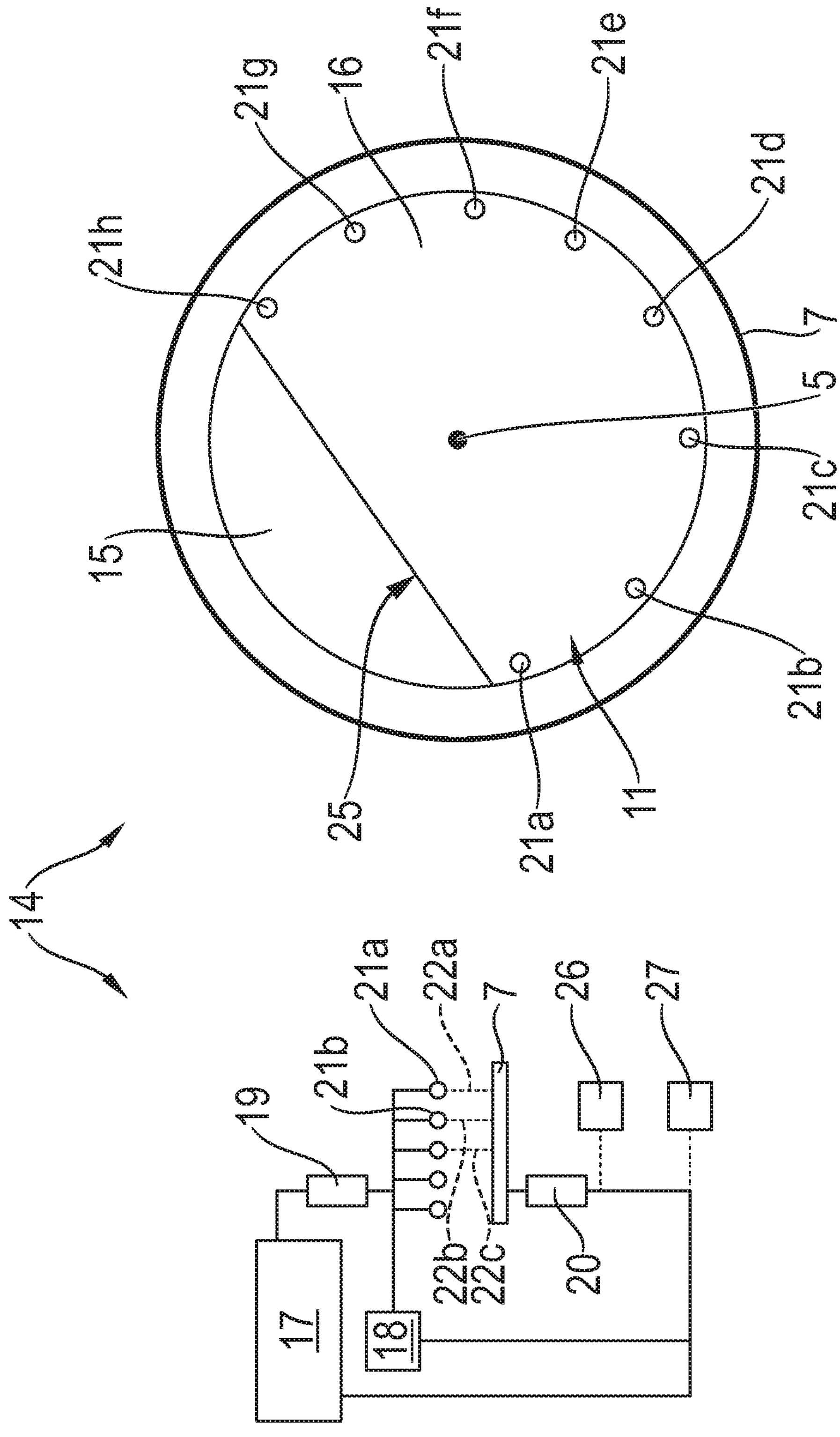
FIG. 3: A sensor arrangement for a mechatronic chassis device as described with reference to FIG. 2, viewed schematically.

FIG. 3 shows a sensor arrangement 14 which, according to the invention, can be used with an actuator 6 as described with reference to FIG. 2 for enabling the ingress of a liquid medium into the housing 7 of the actuator 6 to be recognized in an advantageous manner. To assist explanation FIG. 3 shows, on the left, a schematic circuit diagram and on the right a schematic sectioned representation of the housing 7 of the actuator 6 with a printer circuit board 11 inside it, these two representations corresponding functionally with one another (since they relate to the same situation) and consequently being explained conjointly below.

On the right in the figure, which reproduces a section through the housing 7 of an actuator along the rotation axis 5, it can be seen that the housing 7 has, in projection along the rotation axis 5, a circular outer contour (corresponding to the cylindrical basic shape of the housing as explained in connection with FIG. 2). Inside the housing 7 there is a printed circuit board 11 which is essentially in the form of a flat body fitted in a position perpendicular to the rotation axis 5. Thus, the printed circuit board 11 extends essentially transversely to the rotation axis 5 and has a circular outer contour, at least in part. In the example embodiment shown the printed circuit board 11 is not in contact with the housing 7 at any point.

The printed circuit board 11 is divided into two electrically separated areas 15 and 16 by electrical separation means 25. One area corresponds to a first switching area 15 of the printed circuit board 11, which in turn is supplied from a first on-board network 26 of the motor vehicle. The other area corresponds to a second switching area 16, which in turn is supplied by a second on-board network 27 of the motor vehicle. Thus, the first switching area 15 and the second switching area 16 are operated at different voltage levels, which makes the electrical separation 25 on the printed circuit board 11 necessary in order to avoid a short-circuit between the two on-board networks.

The housing 7 of the actuator 6 consists of an electrically conductive material, a metal. As can be seen on the right in FIG. 3, along an edge section of the printed circuit board 11 extending peripherally close to the housing there are arranged in its second switching area 16 eight measurement points **21*a*, 21*b*, 21*c*, 21*d*, 21*e*, 21*f*, 21*g* and 21*h* a distance apart from one another. From each of these measurement points 21*a* to 21*h* there extends a measuring distance as far as the electrically conductive housing 7, by means of which a filling level of the housing with an electrically conductive medium can be monitored. For this, refer now to the left part of FIG. 3. This shows schematically a circuit with which the arrangement shown on the right of the figure can be used as a sensor arrangement. Represented schematically, a number of measurement points, of which as an example (abbreviated) only the measurement points 21*a*, 21*b* are indexed. From each of these measurement points 21*a*, 21*b* a measurement distance 22*a*, 22*b* (etc.) extends to the housing 7. The measurement points 21*a*, 21*b* (etc.) are connected via a high-resistance series resistor 19 to a voltage supply 17. On the other hand, the housing 7 is connected via a resistor 20 to the ground potential of the electric voltage supply 17. This also corresponds to the ground potential of the first on-board network 26 and the second on-board network 27**.

A control unit 18 (microcontroller) measures the voltage existing at the measurement points **21*a*, 21*b* (etc.) and is therefore able to attribute a voltage drop at one of the measurement points to below a specifiable threshold value, to the event that a medium has succeeded in entering the housing 7, and if necessary, trigger a compensation reaction. This will be explained with reference to FIG. 4**.

Figure 4:
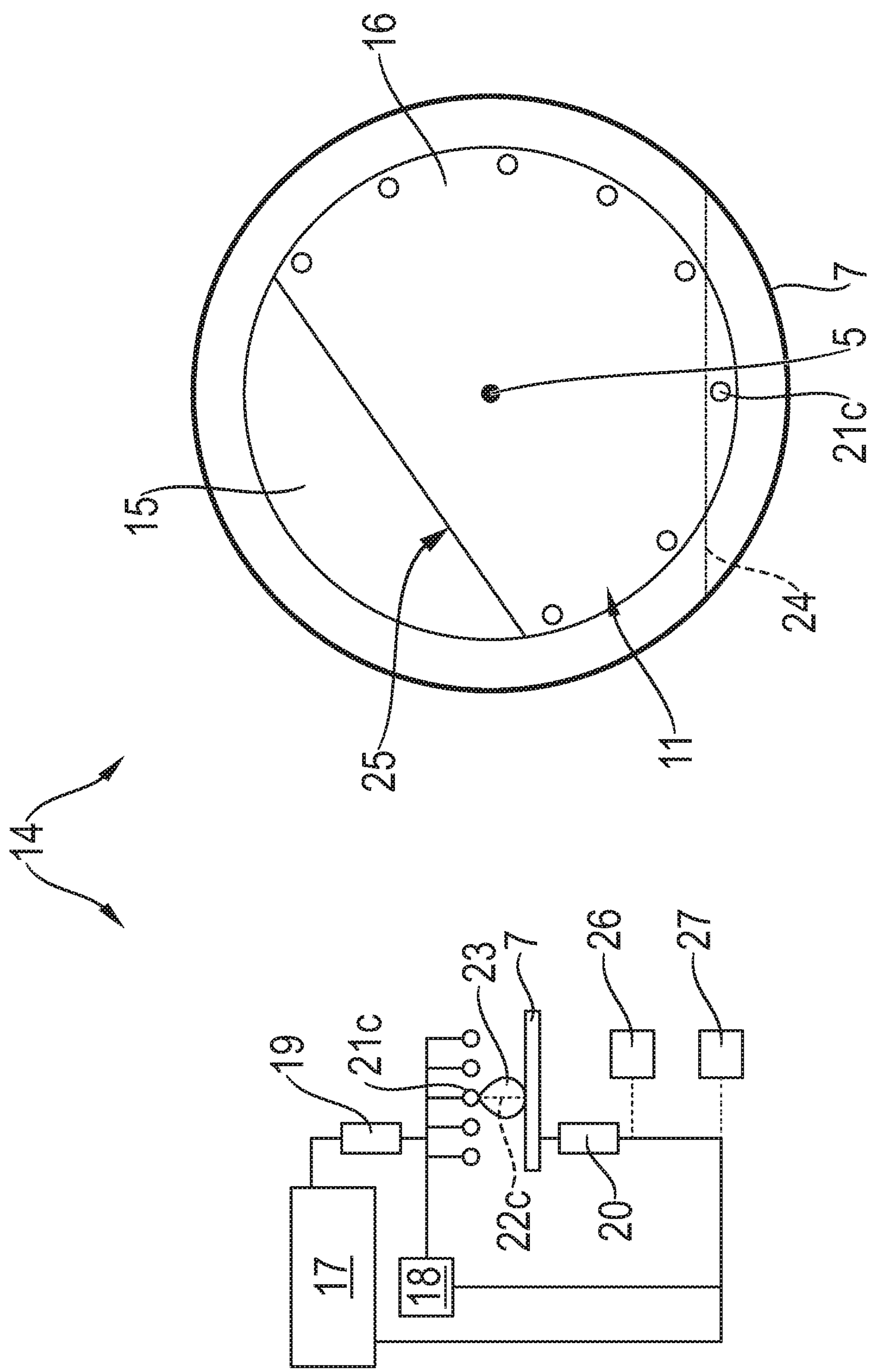
FIG. 4: The sensor arrangement as in FIG. 3, after a medium has entered.

FIG. 4 shows the sensor arrangement whose structure has already been explained with reference to FIG. 3. Otherwise than shown in the FIG. 3 representation, a not inconsiderable amount of water has entered the housing 7 and has collected in a lower area of the housing 7, as indicated by the water-line 24. A measurement point **21*c* at the bottom of the figure in this installed position of the printed circuit board 11 is therefore immersed in the collected water below the water-line 24, which is an undesired situation. On the left of FIG. 4, this is illustrated simply by the ingress of medium 23 in the form of a water droplet. The result of the ingress of the medium 23 is that in this case the measurement distance 22*c* has a substantially higher electrical conductivity, which is detected directly by the control unit 18**, leading to the conclusion that there has been an ingress of medium.

It is clear that the situation shown on the right in FIG. 4 is only an example. If the orientation of the housing 7 or the installed position of the printed circuit board 11 are different (in each case relative to the rotation direction around the rotation axis 5) it can happen that as a result of gravity the liquid medium collects near a different measurement point when the latter is in the lower part of the housing 7. Correspondingly, as explained with reference to FIGS. 3 and 4, the sensor arrangement 14 enables the ingress of a medium to be detected largely regardless of the orientation of the printed circuit plate.

Figure 5:
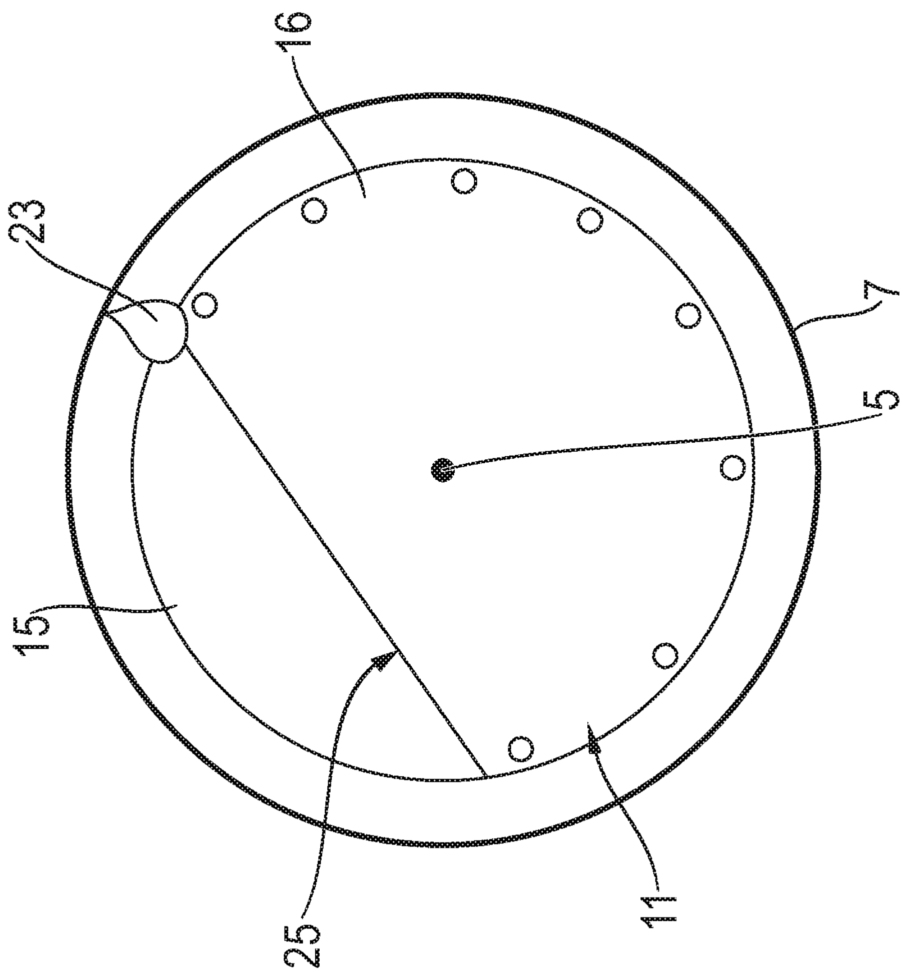
FIG. 5: The sensor arrangement as in FIG. 3, indicating an area particularly at risk from the ingress of a medium.

As a supplement, FIG. 5 is intended to make clear that in the boundary area, i.e. in the area of the electrical separation 25 between the first and second switching areas 15, 16, monitoring for medium contact is particularly important. Since in the example embodiment shown the areas on the printed circuit board 11 in which, owing to limited space, contacts to two different on-board networks (first on-board network 26, second on-board network 27) are comparatively small, in this region monitoring for medium ingress (medium ingress 23 in the form of the water droplet indicated) plays a particularly important part since a bridging-over between the on-board networks can have harmful effects not only on the actuator 6 but also on the vehicle as a whole and its on-board networks and components connected thereto.

Figure 6:
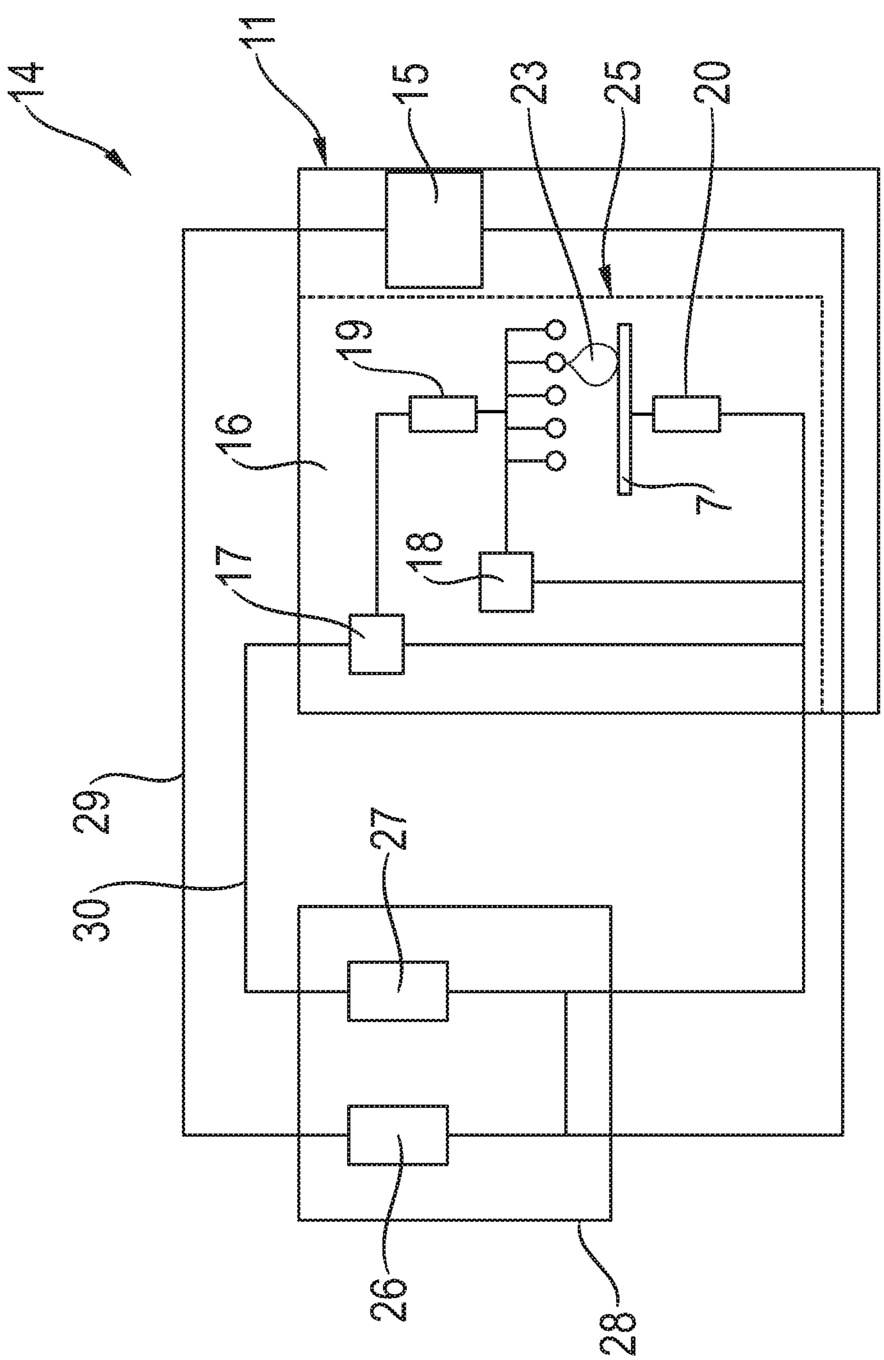
FIG. 6: A schematic representation of a further example of a circuit arrangement.

FIG. 6 shows a schematic representation of another example of a circuit arrangement, which can be used for a sensor arrangement 14 of a mechatronic chassis device as described earlier. This representation shows that the structure is basically the same as described for FIGS. 3 and 5. Accordingly components with the same function are given the same indexes and, to avoid repetitions, do not require further description. Thus, in what follows, specifically the features that are different will be discussed. These suggest a preferred implementation in a vehicle.

In FIG. 6 the printed circuit board 11 is indicated by a square. It is shown that features inside the square (indexes 15, 16, 17, 18, 19, 20) are structurally associated with the printed circuit board. An exception is the housing 7 which, to clarify its additionally perceived electrical function relating to the invention (namely as the ground conductor within the sensor arrangement), is also shown inside the square but which structurally surrounds the printed circuit board 11 (see FIGS. 2 to 5).

From FIG. 6 it can also be seen that the first switching area 15 of the printed circuit board 11 is associated with a first on-board network 26 and the second switching area 16 of the printed circuit board 11 is associated with a second on-board network 27. The first switching area 15 is operated at a first voltage 29 and the second switching area 16 is operated at a second voltage 30. The second voltage 30, for example, is many times higher than the first voltage 29. Correspondingly, on the printed circuit board 11 the switching areas 15 and 16 are electrically separated from one another by the electrical separation means 25, namely in order to avoid any 'cross-talk' between the first switching area 15 and the second switching area 16.

The two onboard networks, the first one 26 and the second one 27, with which the switching areas 15 and 16 are respectively associated and which are supplied by them with voltage, are associated with the vehicle 28. In other words, the on-board networks 26 and 27 are vehicle-specific voltage supplies arranged in the structure of the vehicle containing the actuator 6. Correspondingly the vehicle has two on-board networks 26 and 27 with different voltage levels. As FIG. 6 makes clear, the ground potentials of the two on-board networks 26 and 27 on the vehicle (on the body side) are (electrically) connected with one another. Within the actuator 6, in particular on the printed circuit board 11, in contrast the grounds are separated. From the deliberately chosen electrical separation of the on-board networks on the printed circuit board 11, which however are connected on the body side (vehicle 28) there arises a particular need to avoid electrical 'cross-talk' between the areas 15 and 16 during the operation of the actuator 6, particularly in order to prevent adverse effects on the vehicle-specific on-board networks. The invention contributes to this advantageously.

In an entirely general sense, the above-described voltage monitoring at the measurement distances 22*a* to 22*h* can take place during the ongoing operation of the actuator 6. Since the arrangement of the measurement points on the printed circuit board 11 constitutes a comparatively simple measure, in the manner described effective monitoring of the housing for the ingress of media can be realized by relatively simple means.

INDEXES

1 Adjustable roll stabilizer
2*a*; 2*b* Left wheel: Right wheel
3*a*; 3*b* Left wheel suspension; Right wheel suspension
4*a*; 4*b* Left stabilizer section; Right stabilizer section
5 Rotation axis
6 Actuator
7 Housing
8 Electric motor
9 Multi-stage planetary transmission
11 Printed circuit board
12 Heat sink
13 Power module
14 Sensor arrangement
15 First switching area
16 Second switching area
17 Voltage supply
18 Control unit (microcontroller)
19 Resistor
20 Resistor
21*a*; 21*b*; . . . 21*h* Measurement point (a to h)
22*a*; 22*b*, 22*c* Measurement distance
23 Medium that has entered (electrically conductive, water)
24 Water-line
25 Electrical separation
26 First on-board network
27 Second on-board network
28 Vehicle (body side)
29 First voltage
30 Second voltage

The invention claimed is:

1. A mechatronic chassis device for a motor vehicle, comprising:
a housing;
at least one functional element in the housing; and
means for recognizing an ingress of a liquid medium into the housing, the means using a plurality of measurement points distributed around a peripheral area of the housing, such that at least one of the plurality of measurement points is in a lower area of the housing regardless of a rotational orientation of the housing and/or the at least one functional element relative to a rotation axis.

2. The mechatronic chassis device according to claim 1, wherein the means for recognizing the ingress of the liquid medium comprise a sensor arrangement, which can be operated to monitor a filling level of the housing with an electrically conductive medium.

3. The mechatronic chassis device according claim 1, comprising a monitoring means having one or more measurement points extending in the housing, wherein the one or more measurement points is configured to determine an electrical conductivity.

4. The mechatronic chassis device according to claim 3, wherein each of the one or more measurement points extends from a measurement point on the functional element to the electrically conductive housing.

5. The mechatronic chassis device according to claim 1, wherein the at least one functional element present in the housing comprises a printed circuit board configured for controlling and/or supplying energy to a further functional element present in the housing or for signal processing.

6. The mechatronic chassis device according to claim 1, wherein the functional element is divided into at least two areas electrically separated from one another.

7. The mechatronic chassis device according to claim 1, wherein the functional element comprises an edge section-on which is arranged at least one of the one or more measurement points in a spaced-apart arrangement.

8. The mechatronic chassis device according to claim 1, wherein the housing has a cylindrical shape that extends along a rotation axis.

9. The mechatronic chassis device according to claim 1, wherein the functional element is in the form of an essentially flat body fitted essentially perpendicularly to the rotation axis of the housing.

10. The mechatronic chassis device according to claim 1, wherein each of the one or more measurement points is connected to an electrical voltage source—with the interposition of a first series resistor, and the housing is connected to the ground potential of the electrical voltage source, with the interposition of a second series resistor.

11. The mechatronic chassis device according to claim 1, further comprising a control unit configured to monitor the one or more measurement points for the electrical conductivity by monitoring the electric voltage between individual points of the one or more measurement points and the housing.

12. The mechatronic chassis device according to claim 1, further comprising a control unit operable to attribute a voltage drop at individual points of the one or more measurement points to below a specifiable threshold value to the event that a medium ingress into the housing has taken place, and to trigger a compensating reaction.

13. The mechatronic chassis device according to claim 1, wherein the one or more measurement points are arranged so that in the event of medium ingress, if a critical filling level of the housing with the liquid medium is reached, at least one of the one or more measurement points is immersed in the medium and in that way an electrical connection between an immersed measurement point and the housing is formed.

14. The mechatronic chassis device according to claim 1, comprising an actuator—for one or more of an adjustable roll stabilizer, a steering device, a brake device, and/or a sensor.

15. The mechatronic chassis device according to claim 14, comprising an electric motor and a transmission arranged in the housing with the functional element.

16. An adjustable roll stabilizer for a motor vehicle, comprising:

two stabilizer sections configured to be coupled to wheel suspensions of associated wheels of the motor vehicle;

an actuator for one or more of an adjustable roll stabilizer, a steering device, a brake device, and/or a sensor; and the mechatronic chassis device according to claim 1 with which the stabilizer sections can be rotated relative to one another about a rotation axis in order to influence a rolling behavior of the motor vehicle.

* * * * *